United States Patent [19]
Fetter et al.

[11] Patent Number: 4,679,041
[45] Date of Patent: Jul. 7, 1987

[54] HIGH SPEED Z-BUFFER WITH DYNAMIC RANDOM ACCESS MEMORY

[75] Inventors: John L. Fetter, Los Altos; Jerald R. Evans, Mountain View; Serdar Ergene, San Jose, all of Calif.

[73] Assignee: Sun Microsystems, Inc., Mountain View, Calif.

[21] Appl. No.: 744,496

[22] Filed: Jun. 13, 1985

[51] Int. Cl.⁴ .............................................. G09G 1/16
[52] U.S. Cl. .................................. 340/747; 340/729; 340/750; 340/814
[58] Field of Search ............... 340/721, 729, 747, 750, 340/814

[56] References Cited

U.S. PATENT DOCUMENTS

| | | | |
|---|---|---|---|
| 3,602,702 | 8/1971 | Warnock | 340/729 |
| 4,104,624 | 8/1978 | Hamada | 340/750 |
| 4,156,237 | 5/1979 | Okada et al. | 340/729 |
| 4,209,832 | 6/1980 | Gilham et al. | 340/721 |
| 4,388,621 | 6/1983 | Komatsu et al. | 340/750 |
| 4,426,644 | 1/1984 | Neumann | 340/747 |
| 4,439,760 | 3/1984 | Fleming | 340/747 |
| 4,468,662 | 8/1984 | Tanaka | 340/750 |
| 4,475,104 | 10/1984 | Shen | 340/729 |
| 4,482,979 | 11/1984 | May | 340/750 |

*Primary Examiner*—Marshall M. Curtis
*Attorney, Agent, or Firm*—Blakely Sokoloff Taylor & Zafman

[57] ABSTRACT

The present invention provides apparatus and methods which are most advantageously used in conjunction with a computer display system incorporating the use of a Z-buffer to provide three dimensional hidden surface elimination. A buffer memory is provided which is sufficiently large such that each display element (pixel) on the display is represented by a 16-bit Z value. The Z value corresponds to the Z axis depth of the object at the particular point corresponding to the pixel. The buffer comprises a plurality of dynamic random access memories (D-RAMs) having two operation modes: Normal and Read-Modify-Write (RMW). A counter/pointer register is provided which successively addresses values in the buffer representing successive pixels along scan lines of the display. A graphics processor is provided with coordinates defining a three dimensional image to be displayed and, for each point of the object, computes a current $Z_c$ value beginning at an initial coordinate address in memory. The initial address is loaded into the graphics processor and a D-RAM read-modify write (RMW) cycle is initiated concurrent with the calculation of $Z_c$. This address corresponds to the address for the point at which the graphics processor is computing $Z_c$. The value of $Z_p$, the prior Z value for that address location, is read from the buffer memory and stored in a data-out register. The dynamic RAM in the buffer then waits in the RMW cycle until the processor fetches the $Z_p$ value from the data-out register and compares it to $Z_c$. The value of $Z_p$ in the buffer is updated if $Z_c$ is less than $Z_p$. If $Z_c$ is greater than or equal to the $Z_p$ the RMW cycle is aborted, and the current value of $Z_p$ in the buffer is maintained.

45 Claims, 7 Drawing Figures

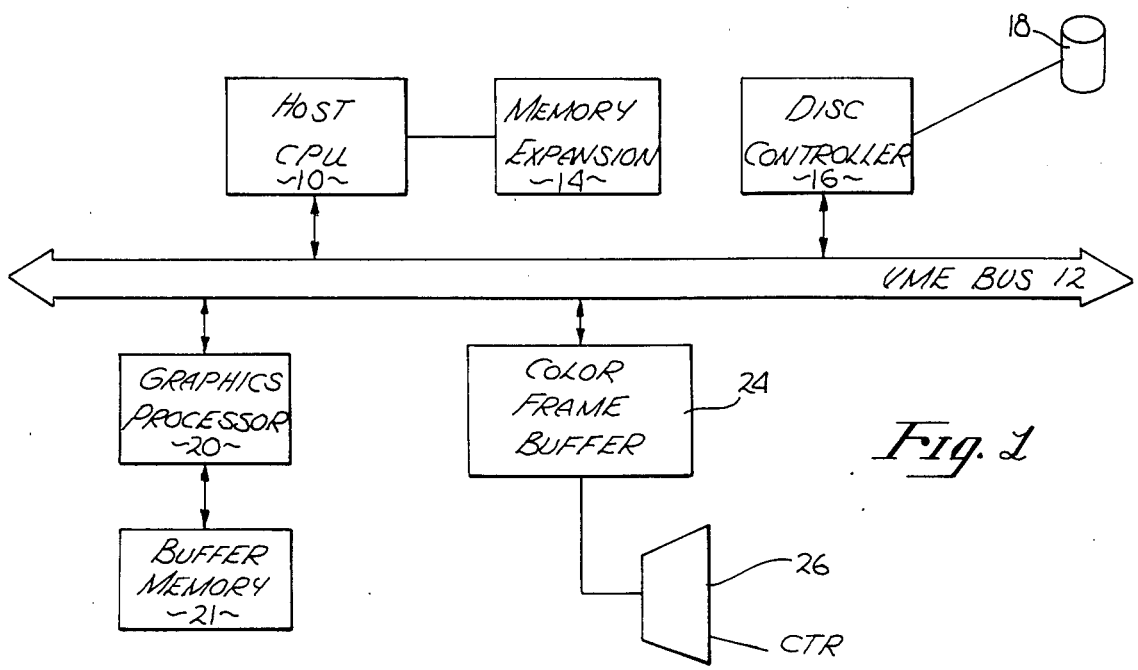
Fig. 1
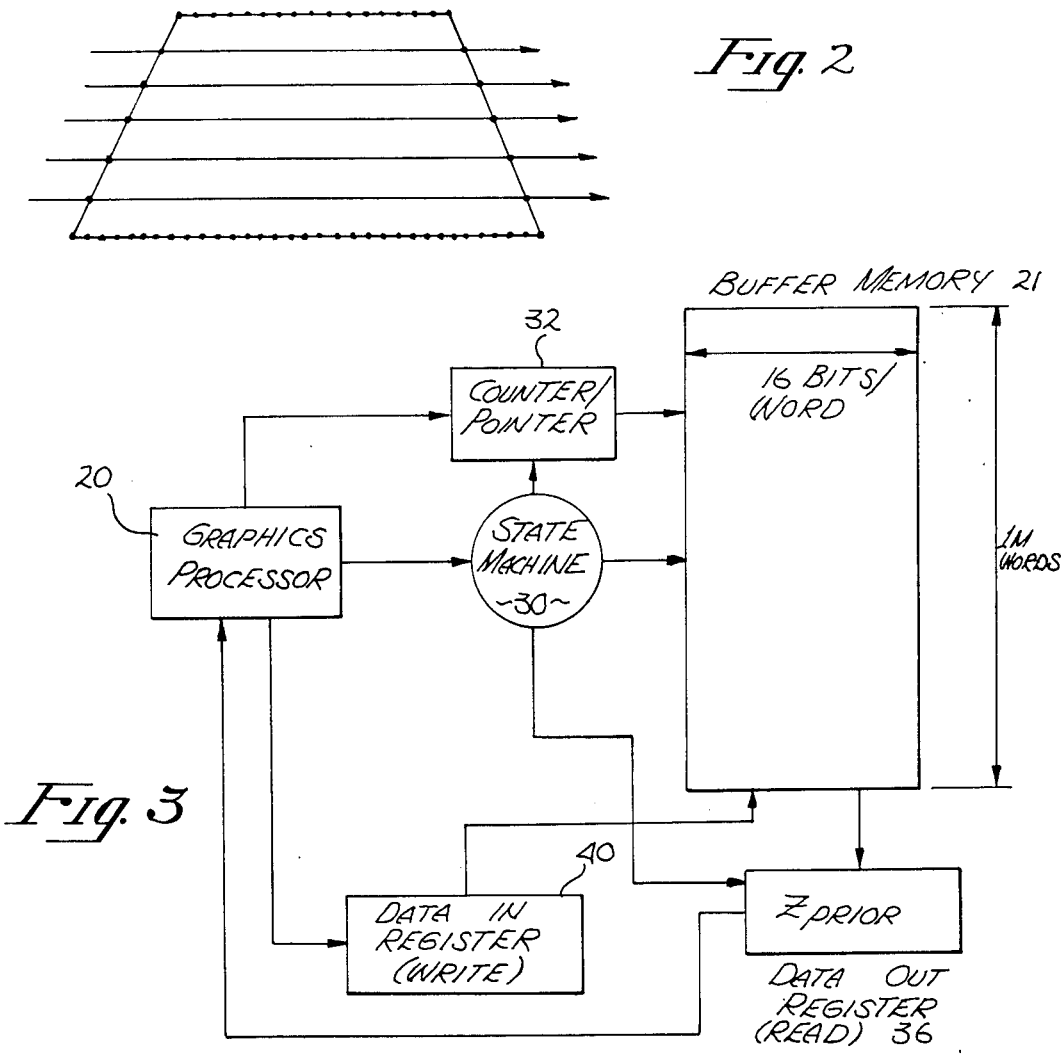
Fig. 2
Fig. 3

HIGH SPEED Z-BUFFER WITH DYNAMIC RANDOM ACCESS MEMORY

BACKGROUND OF THE INVENTION

1. Field of the Invention

The present invention relates to apparatus and methods for displaying three dimensional graphic information, and more particularly, to data processing apparatus and methods for generating or manipulating three dimensional images on a display system.

2. Art Background

In the computing industry, it is quite common to represent and convey information to a user through graphic representations. These representations may take a variety of forms, such as for example, alphanumeric characters, Cartesian or other coordinate graphs, as well as three-dimensional shapes of well known physical objects. For example, in computer aided design (CAD) systems, three dimensional objects may be modeled, reconfigured, and assembled on a two-dimensional cathode-ray tube (CRT) display to assist design engineers in their tasks. However, in displaying three-dimensional objects on a two-dimensional display, the computer system generating the display must be able to include perspective in the images to add dimension. Moreover, in the case where solid three dimensional objects are to be depicted, some mechanism must be utilized such that hidden surfaces are recognized and portions of the image appropriately eliminated, to obtain the desired three dimensional effect.

One common method for eliminating hidden surfaces in computer graphic images involves the use of a Z-buffer. In practice, a Z-buffer is a large memory implemented typically with dynamic random access memory (D-RAM) integrated circuits. A Z-buffer is generally organized into a linear array, wherein sequential values within the Z-buffer correspond to sequential pixels in scan lines of the CRT display. Objects to be displayed are examined, in any order, to determine which pixels they will cover. At each covered pixel, the perspective Z-depth of the object is determined and compared with the Z value of a previously computed object or the background stored in the array. If the new Z value is closer to the viewer, then the new object covers, the previous object, the new pixel is drawn on the screen, and the new Z value replaces the value in the array. (See, U.S. Pat. No. 4,475,104.)

Although the use of the Z-buffer significantly simplifies the problem of eliminating hidden surfaces on three dimensional images, the speed at which a computer system is capable of generating and manipulating a digital image represented in memory is generally limited by the access speed of the memory devices comprising the computer memory. Typically, each memory device corresponds to blocks of adjacent pixels, or other display elements, defining the display. Thus, graphic primitives, such as a polygon, would be represented by a plurality of pixels whose depth values are stored in several of the memory devices. In applications requiring high-speed graphic image manipulation, such as animation, the speed at which the computer system is capable of updating and displaying digital images is dependent upon the access time of the memory devices. Memory devices, such as dynamic random access memories (D-RAMs), have cycle times of approximately 250 nanoseconds.

It has been found that in high speed computer graphic applications these access times are woefully inadequate. Thus, although the computer processor is capable of very high speed data manipulations, the overall system is constrained by the limiting access time of the memory devices which correspond to the pixels of the display.

As will be disclosed below, the present invention provides an apparatus and method which permits a graphics processor to quickly and efficiently compare calculated Z-values with prior Z-values stored in a Z-buffer, to permit high speed three dimensional graphics generation using commercially available D-RAMs. Accordingly, using the teachings of the present invention, the access time of the D-RAMs does not limit the speed by which the computer system can update and display three dimensional graphic images.

SUMMARY OF THE INVENTION

The present invention provides apparatus and methods which are most advantageously used in conjunction with a computer display system incorporating the use of a Z-buffer to provide three dimensional hidden surface removal. In the preferred embodiment, a buffer memory is provided which is sufficiently large such that a depth value for each display element (pixel) is represented by a 16-bit Z value. The Z value corresponds to the Z axis depth of the object at the particular point corresponding to the pixel. The buffer comprises a plurality of dynamic random access memories (D-RAMs) having two operation modes: Normal and Read-Modify-Write (RMW). A counter/pointer register is provided which successively addresses values in the buffer representing successive pixels along scan lines of the display. A graphics processor is provided with coordinates defining a three dimensional object to be displayed and computes an initial coordinate address for each scan line of the object. This initial address is loaded into the counter/pointer register and a D-RAM read-modify write (RMW) cycle is initiated. Concurrently, the graphics processor computes $Z_c$, the Z value for the current point. The location being read from the buffer memory corresponds to the point at which the graphics processor is computing $Z_c$. The value of $Z_p$, the prior Z value for that location, is read from the buffer memory and stored in a data-out register. The dynamic RAM in the buffer then waits in the RMW cycle until the processor fetches the $Z_p$ value from the data-out register and compares it to $Z_c$. If $Z_c$ is less than $Z_p$ then the processor completes the RMW cycle by writing the value of $Z_c$ into the buffer, thereby replacing the old value of $Z_p$ with $Z_c$. In the event that $Z_c$ is greater than or equal to $Z_p$, a start read command is transmitted to the buffer aborting the current RMW cycle, and maintaining the current value of $Z_p$ in the buffer. In either case, the pointer is incremented to the next address to read a successive $Z_p$ value from the buffer and the next RMW cycle initiated. If a refresh for the D-RAMs is required, the refresh cycle is initiated before the next RMW cycle is initiated. Using the present invention, the speed by which Z buffer information may be compared to current Z values for objects to be displayed is significantly increased and is less dependent upon the cycle time limitations of the D-RAMs.

BRIEF DESCRIPTION OF THE DRAWINGS

FIG. 1 illustrates a computer display system incorporating the teachings of the present invention.

FIG. 2 symbolically illustrates scan lines and corresponding pixels, defining an image on a computer display.

FIG. 3 is a block diagram of the present invention.

NOTATION AND NOMENCLATURE

Figure 4:
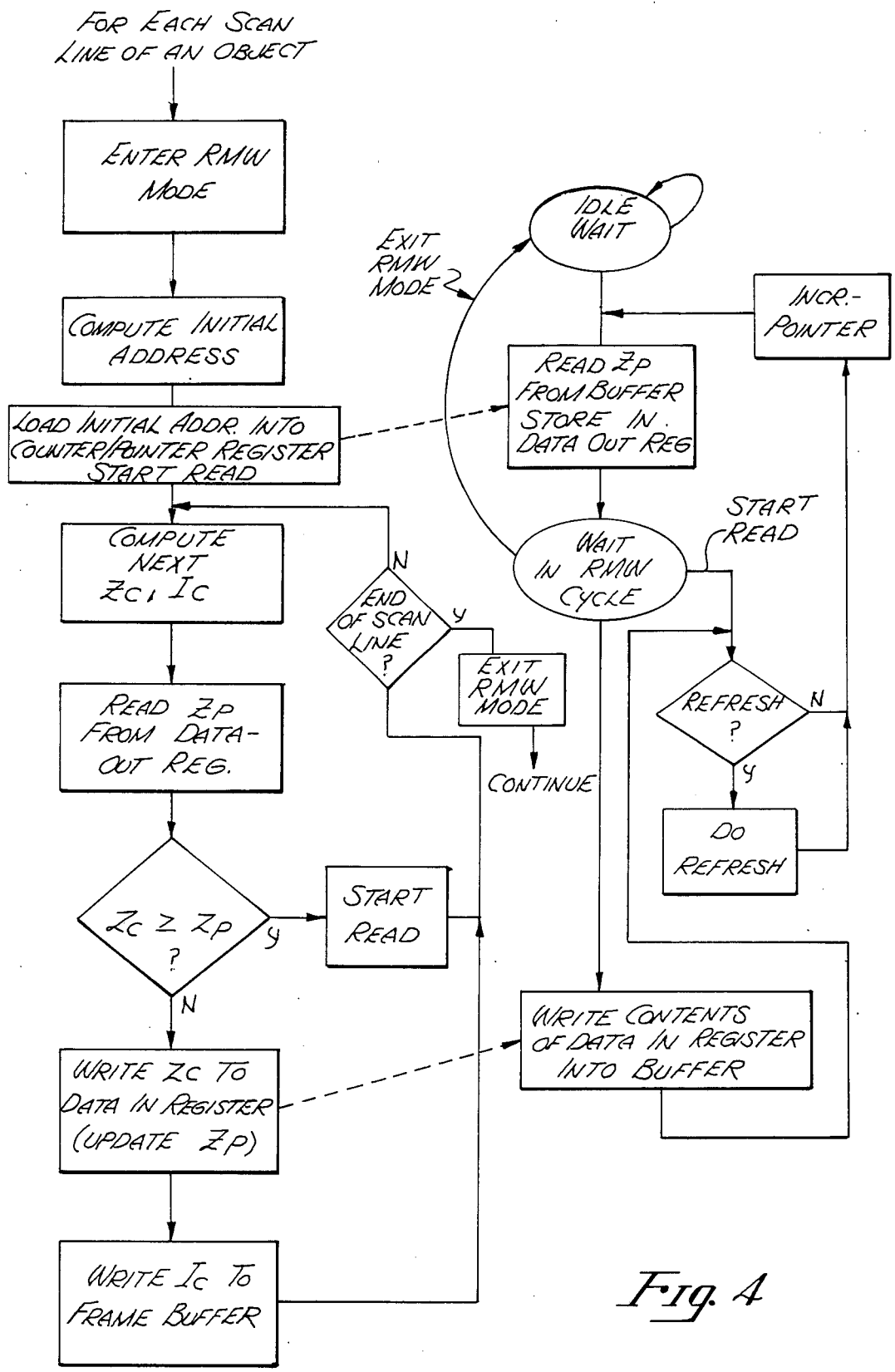
FIG. 4 illustrates the sequence of operations executed by the graphics processor and buffer memory in order to realize the present invention.

The detailed description which follows is presented largely in terms of symbolic representations of operations on data bits within a computer memory. These descriptions and representations are the means used by those skilled in the data processing arts to most effectively convey the substance of their work to others skilled in the art.

An algorithm is here, and generally, conceived to be a self-consistant sequence of steps leading to a desired result. These steps are those requiring physical manipulations of physical quantities. Usually, though not necessarily, these quantities take the form of electrical or magnetic signals capable of being stored, transferred, combined, compared, or otherwise manipulated. It proves convenient at times, principally for reasons of common usage, to refer to these signals as bits, values, elements, symbols, characters, terms, numbers, or the like. It should be kept in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention, since the operations are machine operations. Useful machines for performing the operations of the present invention include general purpose digital computers or other similar devices. The present invention relates to method steps for operating a computer and processing electrical or other (e.g. mechanical, chemical) physical signals to generate other desired physical signals.

The present invention also relates to apparatus for performing these operations. This apparatus may be specially constructed for required purposes or it may comprise a general purpose computer as selectively activated or reconfigured by a computer program stored in the computer. Various general purpose machines may be used with the programs written in accordance with the teachings herein, or it may prove more convenient to construct more specialized apparatus to perform the required method steps. The required structure for a variety of these machines will appear from the description below.

DETAILED DESCRIPTION OF THE INVENTION

An improved computer display system is disclosed, having particular application for use in display systems incorporating the use of Z-buffers for displaying three dimensional objects on two-dimensional displays. In the following description for purposes of explanation, specific numbers, bits, algorithmic conventions, logical operations, etc. are set forth in order to provide a thorough understanding of the present invention. However, it will be apparent to one skilled in the art that the present invention may be practiced without these specific details. In other instances, well know circuits and devices are shown in block diagram form in order not to obscure the present invention unnecessarily.

Referring now to FIG. 1, a computer system for generating digital images in accordance with the present invention is disclosed. A host CPU 10 (which in the presently preferred embodiment is a Motorola 68010 based 32 bit microprocessor) is coupled to VME bus 12 and to local memory resources 14. Host CPU 10 performs a variety of functions including the execution of application software provided by a user which may define two and three dimensional images to be displayed. As shown, a disk controller 16 and hard disk drive 18 may be coupled to bus 12 as an additional memory resource available to CPU 10. A graphics processor 20 with associated buffer memory 21 is coupled to bus 12, and thereby, to host CPU 10. To display images, the present invention utilizes a color frame buffer 24 coupled to VME bus 12 and a cathode ray tube (CRT) 26, as shown. It will be appreciated from the description which follows that although the present invention in its preferred embodiment utilizes a CRT 26, that a variety of other display devices including laser printers, and the like may be utilized.

Objects to be displayed are defined by host CPU 10 in accordance with their X, Y, and Z world coordinates, and are provided to graphics processor 20 over VME bus 12. Graphics processor 20 transforms the three dimensional world coordinates defining the object to be displayed, into representations of the object which may be viewed on the two dimensional CRT 26. For example, graphics processor 20 completes the appropriate operations necessary for scaling and clipping the object to be displayed in light of existing objects currently being displayed on CRT 26. In the case where a variety of three dimensional objects are to be displayed on CRT 26, hidden surfaces must be identified and the images appropriately clipped.

A variety of methods have been developed to identify surfaces which are "hidden" when defining three dimensional images of objects on a two dimensional display screen, such as CRT 26. A common method is to configure a "Z" buffer in a computer memory which stores the Z values, corresponding to depth along the Z axis, for each pixel of the display screen. An object to be displayed is comprised of a plurality of points which correspond to pixels on the display where the image is to appear. In the present embodiment, CRT 26 includes a plurality of display elements (pixels) which are arranged along scan lines, as is common in the art. As illustrated in FIG. 2, a polygon on CRT 26 is comprised of a plurality of horizontal scan lines in which certain pixels are displayed with the color of the polygon (as determined at each pixel by an appropriate shading algorithm). The state of each pixel along a scan line is sequentially routed to the CRT 26 for display, and each pixel corresponds to a unique X, Y address accessible by the graphics processor 20. Since three dimensional shapes are to be displayed, each point defining a polygon includes X, Y, and Z coordinates, where the Z coordinate is a function of a Z perspective depth value. The value of perspective depth "Z" is determined using well known algorithms in the art for such calculations, and is computed by the graphics processor 20 using basic coordinate information supplied by the host CPU 10. As will be described, graphics processor 20 compares existing Z values (Z)for each corresponding pixel on the display with the calculated Z ($Z_c$) value for an object to be displayed, and compares the two in order to identify hidden surfaces. (*See* Newman, William M. and Sproull, Robert F., *Principles of Interactive Computer Graphics*, 2nd Ed., McGraw-Hill, Inc., New York, 1979, pp. 369-370; and Foley, James D. and Van Dam, Andreies, *Fundamentals of Interactive Computer Graphics*, Addison-Wesley Publishing Company, Inc., Reading, Mass., 1982, pp. 560-561.) Once hidden surfaces are identified, the coordinates defining pixels to be enabled on CRT 26 are coupled to VME bus 12 for storage in color frame buffer 24 and subsequent display on the CRT 26.

The speed by which graphics processor 20 generates the needed coordinates to define three dimensional images, is dependant in large part on the speed by which the graphics processor can obtain Z buffer information from the buffer memory 21. As will be disclosed, the present invention eliminates the prior art D-RAM speed limitations by providing the required $Z_p$ values for each address in buffer memory 21, corresponding to a unique display element (pixel) on CRT 26, in a way that is less dependent on the access time of the memory devices.

Referring now to FIG. 3, the present invention is illustrated in block diagram form. In the present embodiment, buffer memory 21 is comprised of dynamic random access memory (D-RAMs), implemented using 256K D-RAM integrated circuits having 16 bit word lengths for a total memory size of two megabytes. Each word within buffer memory 21 is associated with a unique address in the memory and corresponds to a display element on CRT 26 (and in color frame buffer 24). Graphics processor 20, operating through a state machine 30, controls a counter/pointer register 32 through which address locations of buffer memory 21 may be accessed. Generally, the counter/pointer register 32 successively increments through each address of the memory corresponding to pixels along each scan line. Buffer memory 21 also includes a data-out register 36 which stores $Z_p$ values read from addresses defined by counter/pointer register 32 in memory 21. A data-in register 40 is provided, such that Z values in buffer memory 21 may be updated by replacing the current $Z_p$ value with a value provided in the data-in register 40 for the address specified by counter/pointer register 32. Although FIG. 3 diagrammatically and symbolically illustrates buffer memory 21 and associated system elements, it will be appreciated by one skilled in the art that the actual hardware implementation of the embodiment illustrated in FIG. 3 may take a variety of forms, depending on the particular application in which the present invention is used.

Referring now to FIGS. 3 and 4, the operation of the present invention will be described in more detail. The dynamic RAM comprising buffer memory 21 has two primary operation modes: Normal and Read-Modify-Write (RMW). In a Normal mode, the D-RAM comprises a linear array in wich randomly or sequentially addressed data can be read or written. In the RMW mode, the Read is followed by a Write operation at the same address location, which has been found to be useful for use with hidden surface elimination algorithms known in the art. In the RMW mode, the address to be accessed in buffer memory is contained in counter/pointer register 32. A start Read command is issued by graphics processor 20 and the D-RAM Read-Modify-Write cycle is initiated. The fetched data word ($Z_p$ value for the particular location) is loaded into the data-out register 36 which can be read by graphics processor 20. It will be noted that subsequent to the reading of data in buffer memory 21, the D-RAM remains in the RMW state.

The RMW cycle is normally terminated in one of two ways: (1) by loading data into the data-in register 40, which completes the RMW cycle by writing the new data into the D-RAM at the address which was previously read; or, (2) by issuing a new start read command which aborts the RMW cycle. In either case, the counter/pointer register 32 is then incremented and a new RMW cycle is initiated. Using technology commercially available, the D-RAM logic can remain in a waiting state for a Write command, a start Read, or an exit command from the RMW mode for a maximum of ten microseconds. Accordingly, a user must execute a Write, start Read or exit command at least once every ten microseconds while in the RMW mode.

As illustrated in FIG. 4, the present invention overcomes the historic limitations in using D-RAMs for Z buffer operations by overlapping the fetching of data representative of $Z_p$ values, with the computation of new $Z_c$ values for images of objects to be displayed. Graphics processor 20 computes an initial address for each scan line of an image of an object to be displayed on CRT 26. Coincident with the loading of the initial address into counter/pointer register 32, graphics processor 20 issues a start read command which initiates a RMW cycle. Graphics processor 20 then proceeds to compute the current value of $Z_c$, as well as an intensity (color) value $I_c$, for the specified point. As previously discussed, the computations performed by graphics processor 20 to determine the values of $Z_c$ and $I_c$ are well known in the art and will not be repeated in this Specification. As illustrated, during the computation of $Z_c$ and $I_c$ by graphics processor 20, the contents of buffer memory 21 addressed by counter/pointer register 32, are read and routed to data-out register 36 as the prior Z value ($Z_p$). Buffer memory 21 then waits in the RMW cycle until the cycle is aborted, data is placed in the data-in register 40, or RMW mode is exited.

The graphics processor 20 then compares the current $Z_c$ value for the particular addressed point, with the prior $Z_p$ value stored in buffer memory 21. If $Z_c$ is greater than or equal to $Z_p$, the point identified by $Z_c$ lies "behind"a visible point already represented by $Z_p$ in buffer memory 21. Accordingly, graphics processor 20 issues a start read command to buffer memory 21 aborting the RMW cycle without modifying the current value of $Z_p$ stored in memory 21. If a refresh cycle is then required, it is executed. Counter/pointer register 32, is incremented to address the next successive Z value in buffer memory 21, and another RMW cycle is initiated.

In the event that $Z_c$ is less than $Z_p$, graphics processor 20 writes the value of $Z_c$ to the data-in register 40, causing the data to be written into buffer memory 21, thus completing the RMW cycle. The new data $Z_c$ replaces the previous value of $Z_p$ in the buffer memory 21 for the location addressed by counter/pointer register 32. After the write is completed, if a refresh cycle is required, it is executed. Counter/pointer register 32 is incremented to address the next successive Z value in buffer memory 21, and another RMW cycle is initiated. Concurrently, graphics processor 20 writes the value of $I_c$ to the color frame buffer 24 to permit the appropriate color to be displayed on CRT 26, as is well known in the art.

Figure 5:
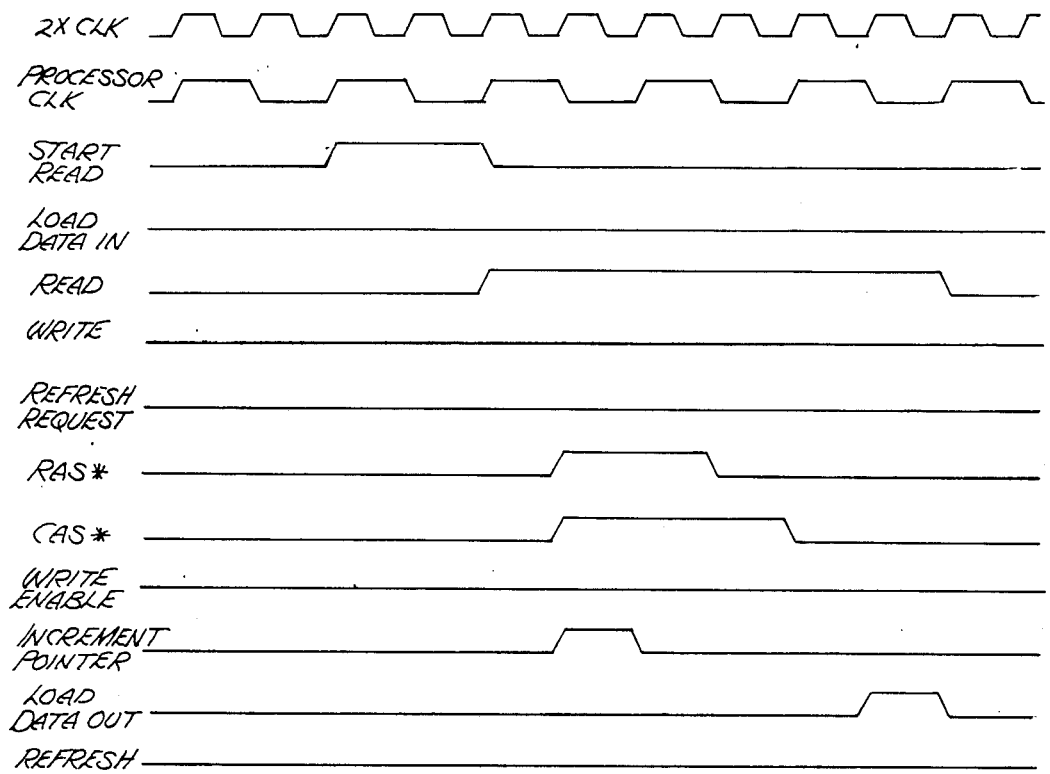
FIG. 5 illustrates the present invention's buffer read-modify-write mode for a read operation.
Figure 6:
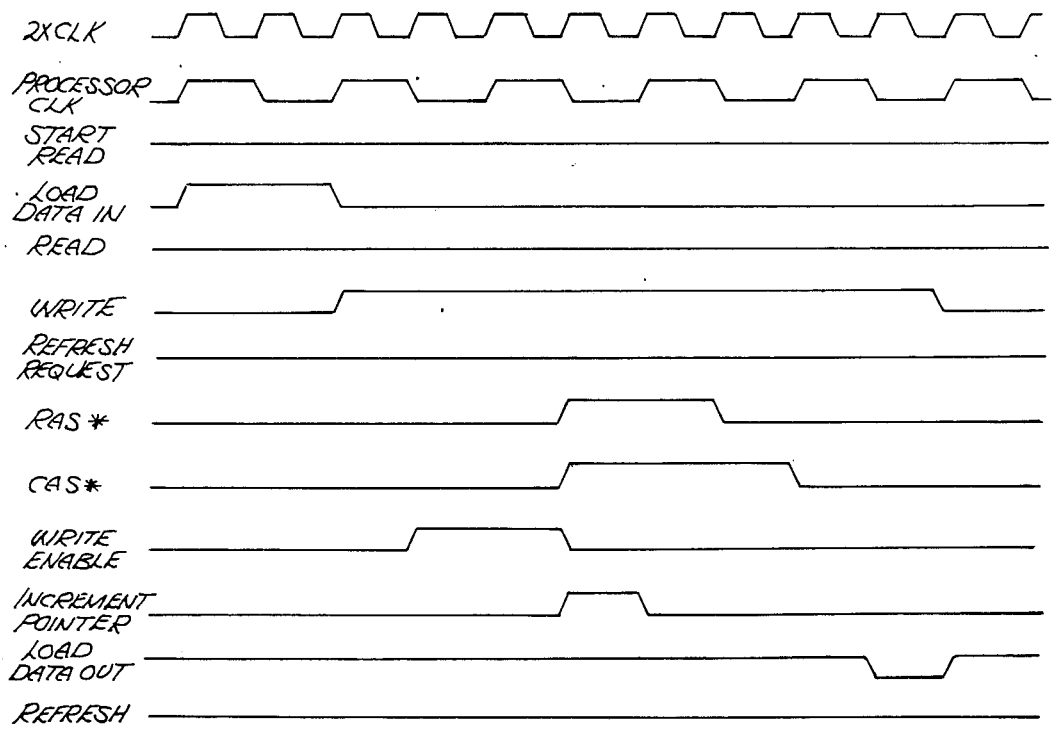
FIG. 6 illustrates the present invention's buffer read-modify-write mode for a write operation.
Figure 7:
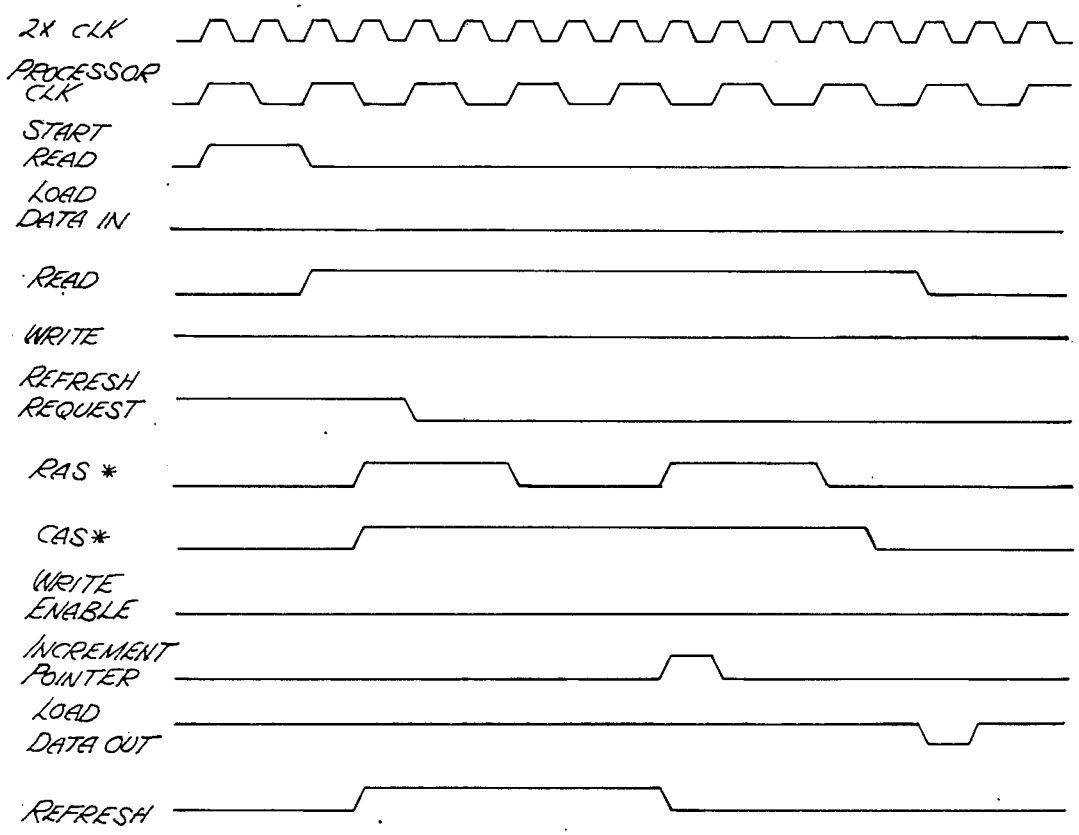
FIG. 7 illustrates the present invention's buffer read-modify-write mode for a refresh cycle.

FIGS. 5, 6 and 7 illustrate the logical states of the various signals wherein buffer memory 21 in a RMW mode accomplishes Read, Write and Refresh operations, respectively.

If using normal D-RAM accesses, the case where $Z_c$ is less than $Z_p$ requires two D-RAM cycles, namely, a read and write. Using RMW mode for this case combines these into a single cycle. In addition, when a Z buffer write operation is necessary, it is done in parallel with the frame buffer write operation. Whether the RMW is aborted or completed, the read of the next pixel's $Z_p$ value is overlapped with the computation of $Z_c$ and $I_c$ by graphics processor 20.

Accordingly, it will be appreciated that the present invention permits the efficient comparison and update of Z values calculated by graphics processor 20 with Z values previously stored in buffer memory 21, thereby permitting very high speed graphic manipulations less dependent on the D-RAM access time. It is contemplated that many changes and modifications may be made, by one of ordinary skill in the art, to the materials and arrangements of elements of the invention without departing from the spirit and scope of the invention.

We claim:

1. A computer display system having a processor for generating images comprised of a plurality of points, and display means for displaying said images, said display means including a plurality of selectively enabled display elements, comprising:

buffer means coupled to said processor for storing a plurality of $Z_p$ values, said $Z_p$ values corresponding to an element on said display and a point of an image previously generated by said processor, and representing a perspective Z depth of said image;

reading means coupled to said buffer means for reading $Z_p$ values from said buffer means;

$Z_c$ value computation means coupled to said processor for calculating a $Z_c$ value for each point of an image generated by said processor to be displayed;

control means coupled to said reading means and said processor, for signalling said reading means to read the next $Z_p$ value generally concurrent with the calculation of the corresponding $Z_c$ value for said image generated by said processor to be displayed;

comparison means coupled to said processor for comparing said calculated $Z_c$ value to said $Z_p$ value read from said buffer, such that if said calculated $Z_c$ value is less than said read $Z_p$ value, said calculated $Z_c$ value replaces said read $Z_p$ value in said buffer, otherwise said read $Z_p$ value is retained in said buffer;

whereby said Z values are compared and updated at high speed.

2. The display system as defined by claim 1, wherein said $Z_p$ values are read from said buffer successively by said reading means.

3. The display system as defined by claim 2, wherein said buffer means includes a data-out register and a data-in register.

4. The display system as defined by claim 3, wherein each of said $Z_p$ values is identified in said buffer means by a unique address, said reading means including a counter/pointer register coupled to said processor and said buffer means.

5. The display system as defined by claim 4, wherein said buffer means comprises dynamic random access memory (D-RAM) devices having a Read-Modify-Write (RMW) cycle.

6. The display system as defined by claim 5, wherein said control means initiates a RMW cycle for said next successive $Z_p$ value prior to the computation by said computation means of said next successive $Z_c$ value.

7. The display system as defined by claim 6, wherein each of said read $Z_p$ values are provided to said data-out register.

8. The display system as defined by claim 7, wherein said comparison means provides said calculated $Z_c$ value to said data-in register if said calculated $Z_c$ value is less than said read $Z_p$ value.

9. The display system as defined by claim 8, wherein said RMW cycle is aborted in the event said $Z_c$ value is greater than or equal to said $Z_p$ value thereby retaining the value of $Z_p$ in said buffer.

10. The display system as defined by claim 9, further including refresh means for refreshing said D-RAM devices, said refreshing occuring after said RMW cycle is terminated.

11. The display system as defined by claim 9, wherein said counter/pointer register is incremented to a successive address after said RMW cycle is terminated and said D-RAM devices are refreshed if required.

12. The display system as defined by claim 11, wherein said $Z_c$ value computation means includes means for computing $I_c$ values for each point of said image generated by said processor to be displayed.

13. The display system as defined by claim 12, wherein said display means includes color frame buffer means coupled between said display and said processor, said $I_c$ values provided to said frame buffer if said $Z_c$ value is less than said $Z_p$ value.

14. In a computer display system for displaying images comprised of a plurality of points, said images being displayed on a display having a plurality of selectively enabled display elements, an improved method for displaying said images at high speed, comprising the steps of:

reading $Z_p$ perspective depth values from buffer means coupled to a processor, each of said $Z_p$ values stored in said buffer corresponding to an element on said display and an image previously displayed by said processor;

calculating a $Z_c$ perspective depth value by said processor for each point of an image to be displayed, said calculation being timed such that said next $Z_p$ value is read from said buffer generally concurrent with the calculation of the next $Z_c$ perspective value;

comparing said calculated $Z_c$ value with said read $Z_p$ value, such that if $Z_c$ is less than $Z_p$ then the calculated value of $Z_c$ replaces said read $Z_p$ value in said buffer, otherwise said read $Z_p$ value is retained in said buffer;

whereby said Z values are compared and updated at high speed.

15. The method as defined by claim 14, wherein said $Z_p$ values are read from said buffer successively.

16. The method as defined by claim 15, wherein said buffer means includes a data-out register and a data-in register.

17. The method as defined by claim 16, wherein each of said $Z_p$ values is identified in said buffer means by unique address, and said reading step is accomplished by reading means for reading $Z_p$ perspective depth values including a counter/pointer register coupled to said processor and said buffer means.

18. The method as defined by claim 17, wherein said buffer means comprises Dynamic Random Access Memory (D-RAM) devices having a Read-Modify-Write (RMW) cycle.

19. The method as defined by claim 18, wherein a RMW cycle for said next successive $Z_p$ value is initiated prior to the computation of said $Z_c$ perspective depth value.

20. The method as defined by claim 19, wherein each of said read $Z_p$ values are provided to said data-out register.

21. The method as defined by claim 20, wherein said calculated $Z_c$ value is provided to said data-in register if said calculated $Z_c$ value is less than said read $Z_p$.

22. The method as defined by claim 21, wherein said RMW cycle is aborted in the event said $Z_c$ value is greater than or equal to said $Z_p$ value, thereby retaining the value of $Z_p$ in said buffer.

23. The method as defined by claim 22, further including the step of refreshing said D-RAM devices after said RMW cycle is terminated.

24. The method as defined by claim 23, wherein said counter/pointer register is incremented to successive address after said RMW cycle is terminated, and said D-RAM devices are refreshed.

25. The method as defined by claim 24, further including the step of computing intensity $I_c$ values for each point of said image generated by said processor to be displayed.

26. The method as defined by claim 25, wherein said display includes color frame buffer means coupled between said display and said processor, said $I_c$ values provided to said frame buffer if said $Z_c$ value is less than said $Z_p$ value.

27. A computer display system having a processor for generating images comprised of a plurality of points, and display means for displaying said images, said display means including a plurality of selectively enabled display elements, comprising:
  a plurality of dynamic random access memory (D-RAM) devices having a Read-Modify-Write (RMW) cycle coupled to said processor for storing a plurality of $Z_p$ values, said $Z_p$ values corresponding to an element on said display and a point of an image previously generated by said processor, and representing a perspective Z depth of said image, each of said $Z_p$ values identified by a unique address in said D-RAM devices;
  reading means coupled to said D-RAM devices for reading successive $Z_p$ values from said buffer means;
  $Z_c$ value computation means coupled to said processor for calculating a $Z_c$ value for each point of an image generated by said processor to be displayed;
  control means coupled to said reading means and said processor, for signalling said reading means to initiate a RMW cycle for said next successive $Z_p$ value concurrent with the calculation of the next successive corresponding $Z_c$ value for said image generated by said processor to be displayed;
  comparison means coupled to said processor for comparing said calculated $Z_c$ value to said $Z_p$ value read from said D-RAM devices, such that if said calculated $Z_c$ value is less than said read $Z_p$ value, said calculated $Z_c$ value replaces said read $Z_p$ value in said buffer and completes said RMW cycle, otherwise said read $Z_p$ value is retained in said D-RAM devices and said RMW cycle is aborted;
  whereby said Z values are compared and updated at high speed.

28. The display system as defined by claim 27, further including a data-out register and a data-in register coupled to said plurality of D-RAM devices.

29. The display system as defined by claim 28, wherein said reading means includes a counter/pointer register coupled to said processor and said plurality of D-RAM devices.

30. The display system as defined by claim 29, wherein each of said read $Z_p$ values are provided to said data-out register.

31. The display system as defined by claim 30, wherein said comparison means provides said calculated $Z_c$ value to said data-in register if said calculated $Z_c$ value is less than said read $Z_p$ value.

32. The display system as defined by claim 31, further including refresh means for refreshing said D-RAM devices, said refreshing occurring after said RMW cycle is terminated.

33. The display system as defined by claim 32, wherein said counter/pointer register is incremented to a successive address after said RMW cycle is terminated and said D-RAM devices are refreshed if required.

34. This display system as defined by claim 33, wherein said $Z_c$ value computation means includes means for computing $I_c$ values for each point of said image generated by said processor to be displayed.

35. This display system as defined by claim 34, wherein said display means includes color frame buffer means coupled between said display and said processor, said $I_c$ values provided to said frame buffer if said $Z_c$ value is less than said $Z_p$ value.

36. In a computer display system for displaying images comprised of a plurality of points, said images being displayed on a display having a plurality of selectively enabled display elements, an improved method for displaying said images at high speed, comprising the steps of:
  reading $Z_p$ perspective depth values from at least one of a plurality of dynamic random access memory (D-RAM) devices having a Read-Modify-Write (RMW) cycle coupled to a processor, each of said $Z_p$ values stored in said D-RAM devices corresponding to an element on said display and an image previously displayed by said processor, each of said $Z_p$ values identified by a unique address in said D-RAM devices;
  calculating a $Z_c$ perspective depth value by said processor for each point of an image to be displayed, said calculation being timed such that a RMW cycle is initiated to read said next $Z_p$ value from said D-RAM devices generally concurrent with the calculation of the next $Z_c$ perspective value;
  comparing said calculated $Z_c$ value with said read $Z_p$ value, such that if $Z_c$ is less than $Z_p$ then the calculated value of $Z_c$ replaces said read $Z_p$ value in said D-RAM devices and completes said RMW cycle, otherwise said read $Z_p$ value is retained in said D-RAM devices and said RMW cycle is aborted; whereby said Z values are compared and updated at high speed.

37. The method as defined by claim 36, wherein said $Z_p$ values are read from said D-RAM devices successively.

38. The method as defined by claim 37, further including a data-out register and a data-in register coupled to said D-RAM devices.

39. The method as defined by claim 38, wherein said reading step is accomplished by reading means for reading $Z_p$ perspective depth values including a counter/pointer register coupled to said processor and said plurality of D-RAM devices.

40. The method as defined by claim 39, wherein each of said read $Z_p$ values are provided to said data-out register.

41. The method as defined by claim 40, wherein said calculated $Z_c$ is provided to said data-in register if said calculated $Z_c$ value is less than said read $Z_p$.

42. The method as defined by claim 41, further including the step of refreshing said D-RAM devices after said RMW cycle is terminated.

43. The method as defined by claim 42, wherein said counter/pointer register is incremented to successive address after said RMW cycle is terminated, and said D-RAM devices are refreshed.

44. The method as defined by claim 43, further including the step of computing intensity $I_c$ values for each point of said image generated by said processor to be displayed.

45. The method as defined by claim 44, wherein said display includes color frame buffer means coupled between said display and said processor, said $I_c$ values provided to said frame buffer if said $Z_c$ value is less than said $Z_p$ value.

* * * * *